United States Patent
Kumar et al.

(10) Patent No.: US 7,831,699 B2
(45) Date of Patent: Nov. 9, 2010

(54) METHOD AND SYSTEM FOR MANAGING CONTROL OF GROUPS OF NETWORKED HETEROGENOUS DEVICES IN A NETWORK

(75) Inventors: Praveen Kumar, San Jose, CA (US); Alan Messer, Los Gatos, CA (US); Yu Song, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1486 days.

(21) Appl. No.: 11/156,497

(22) Filed: Jun. 17, 2005

(65) Prior Publication Data

US 2006/0168177 A1 Jul. 27, 2006

Related U.S. Application Data

(60) Provisional application No. 60/643,060, filed on Jan. 7, 2005.

(51) Int. Cl.
*G06F 15/173* (2006.01)
*G06F 15/16* (2006.01)
(52) U.S. Cl. .................. 709/223; 709/202; 709/227
(58) Field of Classification Search ......... 709/201–203, 709/223–224, 227–228, 250
See application file for complete search history.

(56) References Cited

U.S. PATENT DOCUMENTS

| | | | |
|---|---|---|---|
| 5,491,796 A * | 2/1996 | Wanderer et al. ........... 709/224 |
| 6,192,419 B1 | 2/2001 | Aditham et al. | |
| 6,330,586 B1 | 12/2001 | Yates et al. | |
| 6,362,836 B1 | 3/2002 | Shaw et al. | |
| 6,480,901 B1 | 11/2002 | Weber et al. | |
| 6,594,692 B1 | 7/2003 | Reisman | |
| 6,769,022 B1 | 7/2004 | Weber et al. | |
| 7,206,853 B2 * | 4/2007 | Eytchison et al. ........... 709/230 |
| 7,398,327 B2 * | 7/2008 | Lee ............................. 709/250 |
| 7,571,346 B2 * | 8/2009 | Illowsky et al. ............... 714/10 |
| 2002/0024945 A1 * | 2/2002 | Civanlar et al. ............. 370/352 |
| 2003/0195956 A1 * | 10/2003 | Bramhall et al. ............ 709/223 |
| 2004/0064499 A1 * | 4/2004 | Kasravi ....................... 709/202 |

OTHER PUBLICATIONS

Schulzrinne, H., Casner, S., Frederick, R., and Jacobson, V., "RTP: A Transport Protocol for Real-Time Applications", IETF RFC 3550, [Jul. 2003].

Braden, Ed., R., Zhang, L., Herzog, S., Jamin, S., "Resource Reservation Protocol (RSVP)—Version1 Functional Specification", IETF RFC 2205, [Sep. 1997].

Rosenberg, J., Schulzrinne, H., Camarillo, G., Johnston, A., Peterson, J., Sparks, R., Handley, M., Schooler, E., "SIP: Session Initiation Protocol", IETF RFC 3261, [Jun. 2002].

"SyncML Representation Protocol" syncml.org/docs/syncml_represent_v101, [Jun. 15, 2001].

Kristol, D., Montulli, L., "HTTP State Management Mechanism", IETF RFC 2109, [Feb. 1997].

* cited by examiner

*Primary Examiner*—Bharat N Barot
(74) *Attorney, Agent, or Firm*—Kenneth L. Sherman, Esq.; Michael Zarrabian, Esq.; Myers Andras Sherman & Zarrabian LLP

(57) ABSTRACT

A system and method for managing a group of networked, heterogeneous devices, wherein the group of devices are regarded as a logically single "device". This method separates the state management aspect from control aspect, such that applications using this method need not manage the devices and data directly, and as a result can interact with a simplified, single 'device', or focus on controlling the simplified, single 'device.

27 Claims, 4 Drawing Sheets

10

20

METHOD AND SYSTEM FOR MANAGING CONTROL OF GROUPS OF NETWORKED HETEROGENOUS DEVICES IN A NETWORK

RELATED APPLICATION

Priority is claimed from U.S. provisional application Ser. No. 60/643,060, filed on Jan. 7, 2005, incorporated herein by reference.

FIELD OF THE INVENTION

The present invention related to managing groups of network devices, and more particularly, to managing groups of networked heterogeneous devices.

BACKGROUND OF THE INVENTION

Traditionally, a framework that manages a session is built in a case by case scenario. The application session must manage devices involved in a session directly in an application specific manner. Although devices on the communication ends can be of heterogeneous capacity, each device is considered to be for a separate entity, and must be managed so in the application. As a result, the managing methods (e.g., API) of each device are device-specific. Managing a session with one sending device and one receiving device is simple because only one source device and only one sink device need to be managed. Other methods of device managements involve multiple sink devices. However, these methods still treat the devices separately and do not provide a set of exposed, simple control methods to control multiple devices simultaneously as a group.

BRIEF SUMMARY OF THE INVENTION

The present invention addresses the above shortcomings. In one embodiment, the present invention provides a system and method for managing a group of networked, heterogeneous devices, wherein the group of devices are regarded as a logically single "device". This method separates the state management aspect from control aspect, such that applications using this method need not manage the devices and data directly, and as a result can focus on controlling device functionalities.

Managing devices by treating them as a single "device" according to the present invention has several advantages. A first advantage is that device lifecycle management is simplified because a group of devices can be treated as a single "device". A second advantage is that error conditions and race conditions can be resolved with a uniform method. A third advantage is that the group can be manipulated as a whole. For example, an application can migrate from a set of devices to another set of devices without special migration handling functions. A fourth advantage is that the user is provided with simplicity of interacting with the devices because devices (used together) are referred to as one, and named to allow easy user reference. It is easier for the user to deal with the abstraction of a single device, rather than the detailed usage and coordination of multiple devices.

The present invention allows management of a set of networked heterogeneous devices. Conventionally, applications must collect detailed, device and data specific information, including device-specific protocols, device control functions, data metadata, and their state information. For example, a DVD playing application that plays a movie from a single DVD player to two TVs must manage states of these 2 TVs and the DVD player. However, according to the present invention, the DVD playing application can group 2 TVs and the DVD player into a session and treat the session as a single entity. In addition, devices in this single session are dynamic such that TVs in the session can be removed or added at runtime. The result is that the DVD playing application can play the movie on 2 TVs, and in the mid-play, it can add a third TV into the session, wherein the movie will be displayed on this third TV once it is added into the session.

These and other features, aspects and advantages of the present invention will become understood with reference to the following description, appended claims and accompanying figures.

DETAILED DESCRIPTION OF THE INVENTION

The present invention provides method and system for management of networked, heterogeneous devices, and relieves applications from managing devices individually. According to the present invention, a group of devices is treated as a logically single "device", providing a list of high level, abstract states of the managed "device" that is extensible; and a set of high level interfaces to control the managed "device" instead of controlling each device separately.

It is a common scenario that an application must utilize multiple, heterogeneous devices to accomplish a user request in a network environment. For example, in a networked home environment, a user requests to play a movie from a set-top-box to both a TV in the living room and a TV in the bedroom, simultaneously. The application that accomplishes this request involves in managing three devices: the set-top-box, the TV in the living room, and the TV in the bedroom, each of which three devices have devices-specific functionalities. Traditionally, this is done at application level where an application must manage multiple devices separately and in an application specific manner. This is not only error prone, such as race conditions, but also makes applications complicated. In addition, multiple device management functionalities are duplicated in each application.

The present invention provides a management method in a networked environment that unifies the management of heterogeneous devices. The unification treats multiple, heterogeneous devices as a single entity and defines a set of high level, generic states that are extensible. The result is that upper layer applications need not to concern with the individual device management, and instead can focus on the control aspects of the device functions. A group of networked, heterogeneous devices are regarded as a single entity, a set of high level, generic states are exposed to upper layer applications. Applications receive event notifications when the single entity transitions from one state to another state. In addition, the members in the device group are dynamically changeable within the lifetime of an application. An application can add more devices in the group and remove devices from the group. Example embodiments of the present invention are described below.

In one embodiment, the present invention provides a method that manages a set of networked, heterogeneous devices. For example, the method can manage a set of UPnP devices, and a set of IEEE 1394 devices that use different communication protocols. To deal with different devices with different communication protocols, the method employs a plugin scheme. Each plugin is designed specifically for a type of communication protocol.

Figure 1:
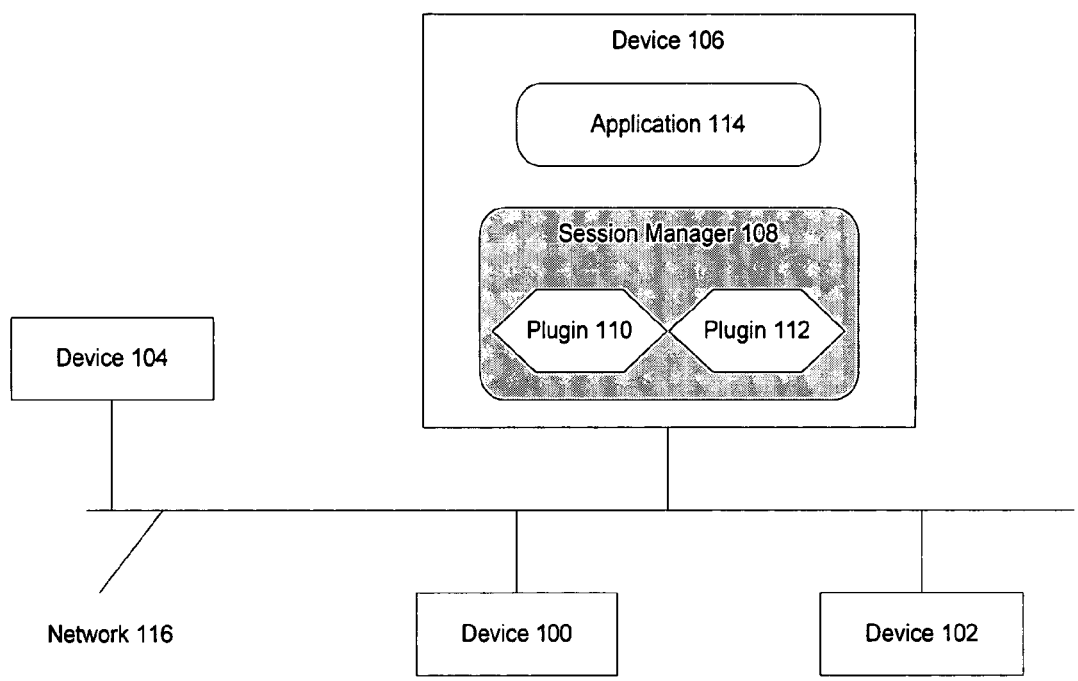
FIG. 1 shows an example functional block diagram of an embodiment of a system for managing groups of networked heterogeneous devices, according to the present invention.

Referring to the example functional block diagram of FIG. 1, an embodiment of an example system 10 according to the present invention which implements the above method includes: an UPnP media rendering device 100, an IEEE1394 media rendering device 102, an UPnP media server device 104, and a controller device 106. The controller device 106 includes a session manager 108. The session manager 108 manages the devices 100, 102 and 104. To manage the device 100 with UPnP protocol, the session manager 108 includes an UPnP plugin 110 for communication with device 100. The session manager 108 further includes an IEEE 1394 plugin 112 for communication with the device 102. The controller device 106 further includes an application 114 for controlling the media streamed from one or more media servers to one or more media rendering units. An example media server is the device 104, and examples media rendering units are the devices 100 and 102. All devices 100, 102, 104 and 106 are connected by a network 116. Examples of network 116 include Ethernet, IEEE 802.11x, etc.

The session manager 108 manages a group of devices (e.g., devices 100, 102, 104, etc.), and sends event notifications to applications (e.g. application 114) when the state of the managed devices changes. In one example, the session manager 108 sends "active", "idle", and "terminate" events to an application. An "active" event indicates that the session manager 108 has initialized the devices and they are in active use. An "idle" event indicates that the state of the devices is idle and waiting to be used. A "terminate" event indicates that the session manager 108 has relinquished the management of the devices. As those skilled in the art recognize, the present invention contemplates use of other/additional events than the aforementioned examples events.

Figure 2:
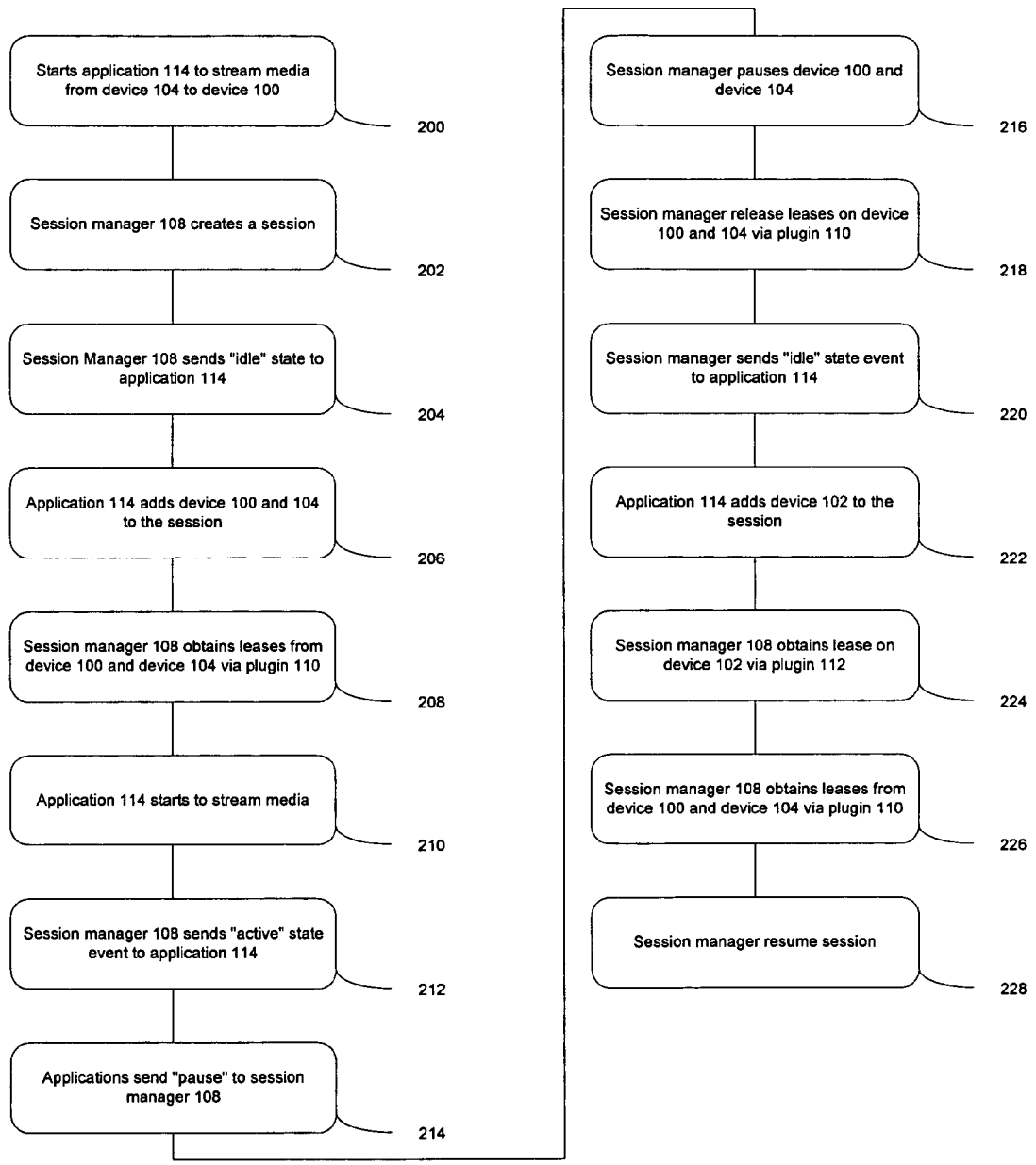
FIG. 2 shows an example flowchart of steps of an embodiment of a method for managing groups of networked heterogeneous devices, according to the present invention.

Now referring also to the flowchart in FIG. 2, an example step-by-step description of streaming media from the device 104 to the devices 100 and 102 under control of the session manager 108 is now provided.

A user starts the application 114 and indicates that he/she wants to stream media from the device 104 to the device 100 (step 200). The application 114 uses the session manager 108 to create a session, wherein initially the created session does not include any devices (step 202). The session manager 108 then sends "idle" session state event to the application 114 (step 204). The application 114 adds the device 100 and the device 104 to the session (step 206). The session manager 108 uses the plugin 110 to communicate with the device 100 and with the device 104, and creates a "read-only" lease (e.g., a contract on a device that specifies the time period the device will be used, and how it is to be used) on the device 104, and a "read-write" lease on device 100 (step 208). Leasing will prevent race conditions. The application 114 selects the desired media from the device 104 and starts to stream the selected media to the device 100 (step 210). The session manager 108 changes the session state from "idle" to "active" and sends the session state to the application 114 (step 212).

At a later time, when the user decides to pause the streaming, the application 114 sends a "pause" message to the session manager 108 (step 214). The session manager 108 first pauses the streaming from the device 104 to the device 100 (step 216). The session manager 108 uses the plugin 110 to release the "read-only" lease on the device 104, and to release the "read-write" lease on the device 100 (step 218). The session manager 108 sends "idle" session state event to the application 114 (step 220).

At a later time, the user decides to resume the streaming again, but to the device 100 as well as the device 102 simultaneously, wherein the application 114 first adds the device 102 to the previous session via the session manager 108 (step 222). The session manager 108 uses the plugin 112 to create a "read-write" lease on the device 102 (step 224). The session manager 108 uses the plugin 110 to create a "read-only" lease on the device 104 and a "read-write" lease on the device 100 (step 226). The state goes 'active', and the session manager 108 resumes the streaming wherein the stream goes to the device 100 and to the device 102, simultaneously (step 228).

Figure 3:
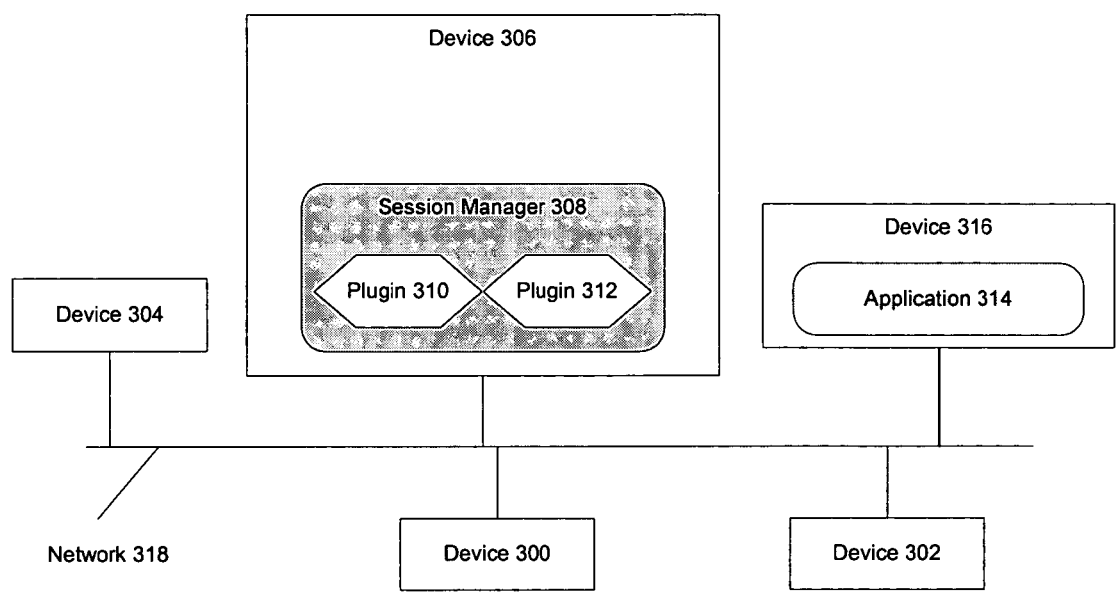
FIG. 3 shows an example functional block diagram of another embodiment of a system for managing groups of networked heterogeneous devices, according to the present invention.

Now referring to the example functional block diagram of FIG. 3, an embodiment of another system 20 according to the present invention implements a method that manages a set of networked, heterogeneous devices with a different application. For example, the system 20 can dynamically remove devices in a group of devices under management. Example heterogeneous devices can include UPnP devices, and/or can IEEE 1394 devices that use different communication protocols. To deal with different devices with different communication protocols, a plugin scheme is utilized. Each plugin is designed specifically for a type of communication protocol.

The example system 20 in FIG. 3 includes: an UPnP media rendering device 300, an IEEE1394 media rendering device 302, an UPnP media server device 304, and a controller device 306. The controller device 306 includes a session manager 308 which manages the devices 300, 302 and 304. To manage the device 300 with UPnP protocol, the session manager 308 includes a UPnP plugin 310 for communication with the device 300. The session manager 308 also contains an IEEE 1394 plugin 312 for communication with the device 302. An application 314 in a separate device 316 controls the stream from the device 304 to the device 300 and/or the device 302 via the controller device 306. In this embodiment, the device 304 comprises a media server that serves media streams, and the devices 300 and 302 each comprises a rendering unit that receives and display media. All of the devices 300, 302, 304, 306 and 316 are connected by a network 318. Examples of the network 318 include Ethernet, IEEE 802.11x, etc.

The session manager 308 manages a group of devices (e.g., devices 300, 302, 304, 316, etc.), and sends event notifications to applications (e.g., application 314) when the state of the managed devices changes. In this example, the session manager 308 sends "active", "idle", and "terminate" events to applications. An "active" event indicates that session manager 308 has initialized the devices and they are in active use. An "idle" event indicates that the state of the devices is idle and waiting to be used. And, a "terminate" event indicates that the session manager 308 has relinquished the management of the devices.

Figure 4:
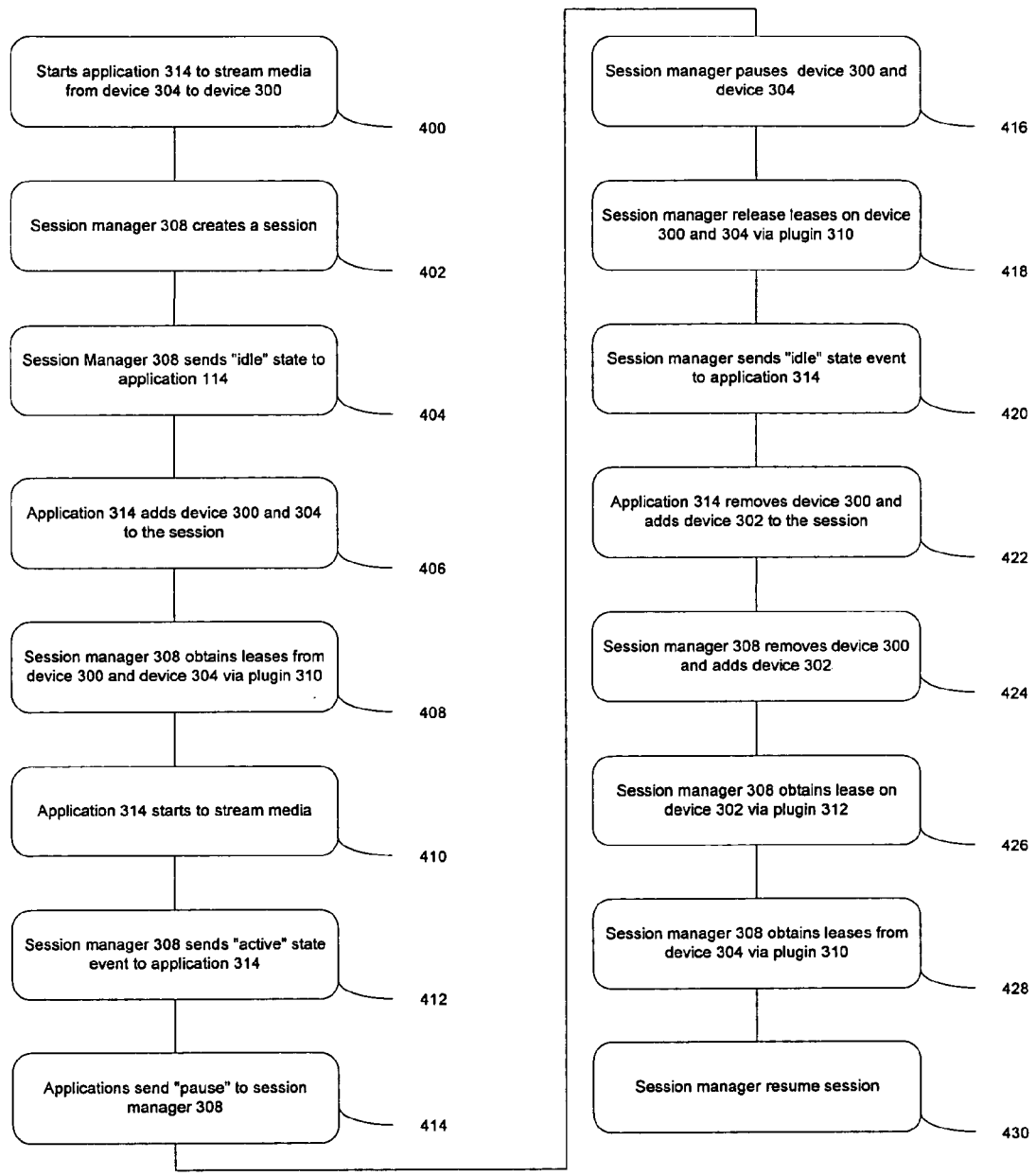
FIG. 4 shows an example flowchart of steps of another embodiment of a method for managing groups of networked heterogeneous devices, according to the present invention.

Now referring also to the flowchart in FIG. 4, an example step-by-step description of streaming media from the device 304 to the devices 300 and 302 under control of the session manager 308 is now provided.

A user starts the application 314 and indicates that he/she wants to stream media from the device 304 to the device 300 (step 400). The application 314 uses the session manager 308 to create a session, wherein initially the created session does not include any devices (step 402). The session manager 308 sends an "idle" session state event to the application 314 (step 404). The application 314 adds the device 300 and the device 304 to the session (step 406). The session manager 308 uses the plugin 310 to communicate with the device 300 and with the device 304, and creates a "read-only" lease on the device 304, and a "read-write" lease on device 300 (step 408). The application 314 selects the desired media from the device 304 and starts to stream the selected media to the device 300 (step 410). The session manager 308 changes the session state from "idle" to "active" and sends the session state to the application 314 (step 412).

At a later time, when the user decides to pause the streaming, the application 314 sends a "pause" message to the session manager 308 (step 414). The session manager 308 first pauses the streaming from the device 304 to the device 300 (step 416). The session manager 308 uses the plugin 310 to release the "read-only" lease on the device 304, and to release the "read-write" lease on the device 300 (step 418). The session manager 308 sends an "idle" session state event to the application 314 (step 420).

At a later time, the user decides to resume the streaming. However, the stream should go to the device 302 instead of the device 300. Accordingly, the application 314 first removes the device 300 from the session, and adds the device 302 to the session (step 422). The session manager 308 removes the device 300 from the devices under its management, and adds the device 302 to the devices under its management (step 424). The session manager 308 uses the plugin 312 to create a "read-write" lease on the device 302 (step 426). The session manager 308 uses the plugin 310 to create a "read-only" lease on the device 304 (step 428). The state goes 'active', and the session manager 308 resumes the streaming, wherein the stream goes from the device 304 to the device 302 (step 430).

The present invention allows management of a set of networked heterogeneous devices. Conventionally, applications must collect detailed, device and data specific information, including device-specific protocols, device control functions, data metadata, and their state information. For example, a DVD playing application that plays a movie from a single DVD player to two TVs must manage states of these 2 TVs and the DVD player. However, according to the present invention, the DVD playing application can group 2 TVs and the DVD player into a session and treat the session as a single entity. In addition, devices in this single session are dynamic such that TVs in the session can be removed or added at runtime. The result is that the DVD playing application can play the movie on 2 TVs, and in the mid-play it can add a third TV into the session, wherein the movie will be displayed on this third TV once it is added into the session.

The present invention has been described in considerable detail with reference to certain preferred versions thereof; however, other versions are possible. Therefore, the spirit and scope of the appended claims should not be limited to the description of the preferred versions contained herein.

What is claimed is:

1. A system for managing a plurality of networked, heterogeneous devices, the system comprising:
    an application configured to communicate with a user, wherein the application is further configured to control heterogeneous devices;
    a session manager configured to manage the heterogeneous devices as a group wherein the application utilizes the session manager and event notifications from the session manager to achieve at least one operation;
    wherein the session manager maintains a dynamic session by forming a group of the heterogeneous devices and retaining the attributes of the group of the heterogeneous devices, wherein the session manager manages the group of the heterogeneous devices as a single logical device that transitions from one state to another state based on state interaction of the managed heterogeneous devices necessary to control the managed heterogeneous devices, wherein the session manager provides high level state information for the logical device by sending session state event notifications to the application
    when the state of the logical device changes, the session state event notifications providing the high level state information representing state transitions of the logical device.

2. The system of claim 1, wherein the session manager manages a leasing relationship with the group of heterogeneous devices, wherein the session manager further includes communication protocol modules for communication with the heterogeneous devices.

3. The system of claim 2, wherein the leasing relationship further comprises obtaining and releasing contracts with the group of heterogeneous devices, wherein the contracts specify how and when the heterogeneous devices are to be used, wherein the application receives the event notifications and monitors the group of heterogeneous devices accordingly, wherein an event notification is asynchronous.

4. The system of claim 3, wherein said event notifications include:
    an "active" event notification, indicating that the session manager has initialized the devices and they are in active use;
    an "idle" event notification, indicating that the state of the devices is idle and waiting to be used; and
    a "terminate" event notification, indicating that the session manager has relinquished management of the devices.

5. The system of claim 4, wherein based on user request, the application further utilizes the session manager to create a session.

6. The system of claim 5, wherein session manager further sends an "idle" session state event notification to the application such that the application adds a first device and a second device to the session.

7. The system of claim 6, wherein the session manager further communicates with the first and second devices to set the state of each device.

8. The system of claim 7, where the application further initiates transfer of information between the first and second devices based on the device states set by the session manager.

9. The system of claim 8, wherein the session manager further changes the session state from "idle" to "active" and sends the session state notification to the application.

10. The system of claim 9, wherein based on user request the application sends a change message to the session manager, such that the session manager changes the transfer of information between the first and second devices.

11. The system of claim 9, wherein based on user request the application sends a change message to the session manager, such that the session manager pauses transfer of information between the first and second devices, and sends an "idle" session state event to the application.

12. A method for managing a plurality of networked, heterogeneous devices, comprising:
    in a controller device:
        managing heterogeneous devices as a group in a session management process;
        controlling the heterogeneous devices as a group in an application process;

wherein the application process communicates with a user, wherein the session management process maintains a dynamic session by forming a group of heterogeneous devices and retaining the attributes of the group of the heterogeneous devices, wherein the session management process manages control of the group of heterogeneous devices as a single device that transitions from one state to another state based on state interaction of the managed heterogeneous devices necessary to control the managed heterogeneous devices, and sends session state event notifications to the application process when the state of the logical device changes, and the session state event notifications providing a high level state information representing state transitions of the logical device.

13. The method of claim 12, wherein the session management process manages a leasing relationship with the group of heterogeneous devices, wherein managing the heterogeneous devices further includes using communication protocol plug-ins in the session management process for communication with the heterogeneous devices.

14. The method of claim 13, wherein the leasing relationship further comprises obtaining and releasing contract with the group of heterogeneous devices, wherein the contracts specify how and when the heterogeneous devices are to be used, wherein the step of controlling further includes utilizing the event notifications in the application process to control the devices.

15. The method of claim 14, wherein said event notifications include:
   an "active" event notification, indicating that the session management process has initialized the devices and they are in active use;
   an "idle" event notification, indicating that the state of the devices is idle and waiting to be used; and
   a "terminate" event notification, indicating that the session management process has relinquished management of the devices.

16. The method of claim 15, further including receiving a user request in the application process; and
   utilizing the session management process to create a session.

17. The method of claim 16, further including sending "idle" or "active" session state event notification from the session management process to the application process such that the application process adds a first device and a second device to the session.

18. The method of claim 17, further including the session management process communicating with the first and second devices to set the state of each device.

19. The method of claim 18, further including the application process initiating transfer of information between the first and second devices based on the device states set by the session management process.

20. The method of claim 19, further including the session management process changing the session state from "idle" to "active" and sending the session state notification to the application process.

21. The method of claim 20, further including
   receiving a user request in the application process; and
   sending a change message to the session management process, such that the session management process changes the transfer of information between the first and second devices.

22. The method of claim 20, further including
   receiving a user request in the application process; and
   sending a change message to the session management process, such that the session management process pauses transfer of information between the first and second devices, and sends an "idle" session state event to the application process.

23. The system of claim 20, wherein the session manager includes plug-in devices for managing the group of heterogeneous devices as single device, wherein each plug-in is configured for a type of communication protocol.

24. The system of claim 20, wherein the session manager unifies management of the heterogeneous devices, wherein the managed devices are dynamic and can be added or removed at any time during use.

25. A system for managing a plurality of networked, heterogeneous devices, the system comprising:
   a session manager configured to manage the heterogeneous devices as a group; and
   an application configured to control the heterogeneous devices utilizing the session manager and event notifications from the session manager, wherein the application is configured to communicate with a user;
   wherein the session manager maintains a dynamic session by forming a group of heterogeneous devices and retaining the attributes of the group of the heterogeneous devices, wherein the session management process manages the group of heterogeneous devices as a single logical device that transitions from one state to another state based on interactive states of the managed heterogeneous devices in the group of heterogeneous devices, and the session manager provides high level state information for the logical device by sending session state event notifications to the application when the state of the logical device changes, the session state event notifications providing high level state information representing said logical device transitions, and the session manager further communicates with a first device and a second device in the group of heterogeneous devices to set the state of each device, the application further initiates transfer of information between the first and second devices based on the device states set by the session manager, wherein based on a user request the application sends a change message to the session manager, such that the session manager changes the transfer of information between the first and second devices.

26. The system of claim 25, wherein the session manager manages a leasing relationship with the group of heterogeneous devices, wherein a set of plug-in devices providing unification for the group of heterogeneous devices to be managed as one device includes a Universal Plug and Play (UPnP) media rendering device.

27. The system of claim 26, wherein the leasing relationship further comprises obtaining and releasing contract with the group of heterogeneous devices, wherein the contracts specify how and when the heterogeneous devices are to be used, wherein a set of plug-in devices providing unification for the group of heterogeneous devices to be managed as one device includes an IEEE 1394 plug-in device.

* * * * *